United States Patent Office 3,344,169
Patented Sept. 26, 1967

3,344,169
NOVEL 1-ACYLOXY-6-HYDROXY-9-METHYL-Δ$^{4(10)}$-OCTALINS AND -TRANS-DECALINS
Marinus Los, Trenton, N.J., assignor to American Cyanamid Company, Stamford, Conn., a corporation of Maine
No Drawing. Filed Nov. 8, 1963, Ser. No. 322,522
6 Claims. (Cl. 260—473)

ABSTRACT OF THE DISCLOSURE

This disclosure describes compounds of the class of 1-acyloxy-6-hydroxy-9-methyl-Δ$^{4(10)}$-octalins and 1-acyloxy-6-hydroxy-9-methyl-trans-decalins useful as intermediates for the preparation of the steroid moiety.

This invention relates to new organic compounds. More particularly, it relates to compounds useful in the synthesis of the steroid moiety and methods of preparing said compounds.

In the past several years drug products for different purposes have been developed having in common the steroid structure. For the most part starting materials for the preparation of these drugs have been obtained from vegetable sources such as the Mexican yam. These sources contain the steroid moiety as such, which is extracted, purified etc. to obtain the starting material desired. The synthesis of the steroid molecule from simpler substances has been accomplished. However, although the steroid art has developed rapidly in the past several years, it has become increasingly apparent that new and improved steroid intermediates and substantially improved processes for the preparation thereof are required if the art is to continue to advance.

In general, useful intermediates have been made available only with the utmost difficulty. Availability has hinged on the use of tedious time consuming processes, employment of elaborate isomer separation or recovery systems, and have required the use of rather expensive starting materials. Such problems are avoided or largely overcome by the process of the instant invention which provides high purity steroid intermediates in good yield from readily available, inexpensive, starting materials.

The present invention involves a number of steps from known compounds such as, 1-acetoxy-6-oxo-9-methyl-Δ$^{5(10)}$-octalin to compounds such as 1-carboxy-8β-methyl-trans-hexahydroindanone-5. The conversion of the latter compound to steroid compounds has been described in J. Org. Chem. 28, pages 748–755 (1963). The present compounds are thus new intermediates useful in the synthesis of steroids made and sold for a variety of uses.

The instant invention involves reacting for example, 1-acetoxy-6-oxo-9-methyl-Δ$^{5(10)}$-octalin (I) with an acetic anhydride-acetyl chloride mixture to form 1,6-diacetoxy-9-methyl-Δ$^{4(10),5}$-hexahydronaphthalene (II) and reducing this product with, for example, sodium borohydride to form 1-acetoxy-6-hydroxy-9-methyl-Δ$^{4(10)}$-octalin (III). This compound in turn is hydrogenated catalytically to 1-acetoxy-6-hydroxy-9-methyl-trans-decalin (IV) which results in substantially all the desired trans isomer. The resulting product is then transformed by chromic acid oxidation to 1-acetoxy-6-oxo-9-methyl-trans-decalin (V). The latter compound is refluxed with ethylene glycol and a strong acid catalyst, such as, p-toluenesulphonic acid to form 1-acetoxy-6,6-ethylenedioxy-9-methyl-trans-decalin (VI) which in turn is converted to 6,6-ethylenedioxy-1-hydroxy-9-methyl-trans-decalin (VII) by saponification of the ester with an alkali metal hydroxide. Oxidation of 6,6-ethylenedioxy-1-hydroxy-9-methyl-trans-decalin with a suitable oxidizing agent, such as Jones' reagent produces the intermediate 6,6-ethylenedioxy-1-oxo-9-methyl-trans-decalin (VIII) which, when reacted with an alkyl nitrite and potassium t-butoxide in t-butanol, produces 6,6-ethylenedioxy-2-oximino-1-oxo-9-methyl-trans-decalin (IX). The latter product is isolated from the reaction mixture in high yield by acidification, preferably with sodium dihydrogen phosphate, and extracting the product into ether. The purified product is transformed into the diazo ketone, 6,6-ethylenedioxy-2-diazo-9-methyl-1-oxo-trans-decalin (X) by dissolving in alkali and reacting with chloramine. The diazo ketone is readily separated from the reaction mixture by extraction of the reaction mixture with a solvent such as, ether and this product need not be purified further since it can be changed to 1-carboxy-8β-methyl-trans-hexahydroindanone-5 (XI) by photolysis of the diazo ketone in an aqueous-sodium bicarbonate system. On the other hand, if the photolysis is carried out in an alcohol, 1-carboalkoxy-5,5-ethylenedioxy-8β-methyl-trans-hexahydroindane (XII) is obtained which is convertible to XI by base and acid hydrolysis.

The following flowsheet describes the steps referred to above:

FLOWSHEET

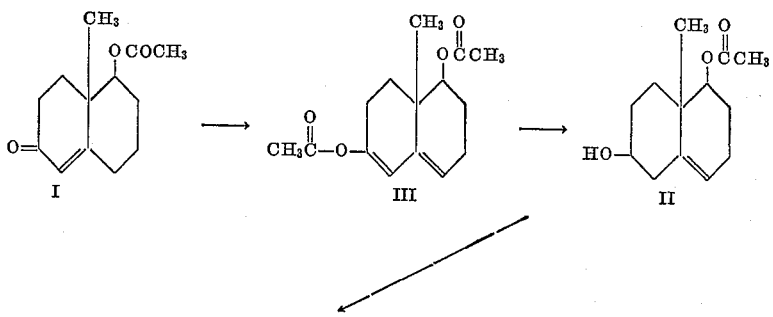

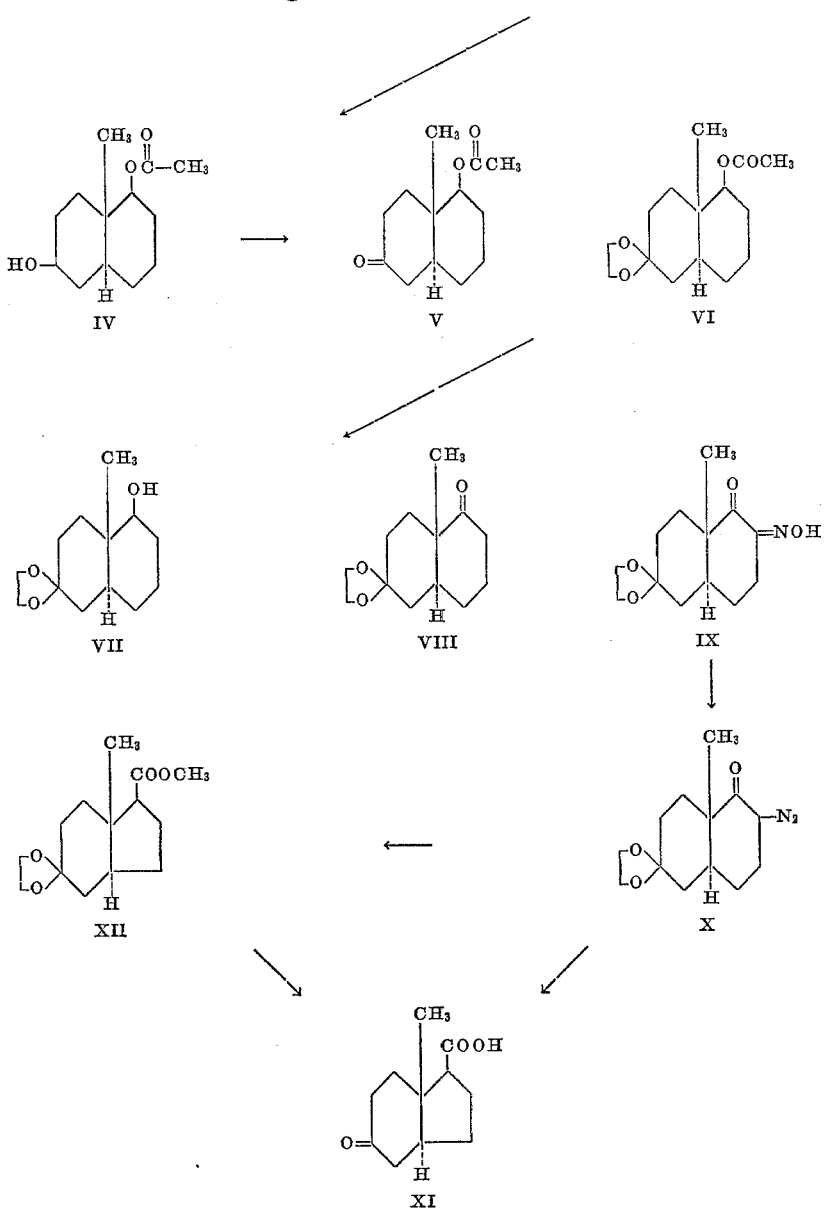

Although the method for the preparation of 1,6-diacetoxy-9-methyl - $\Delta^{4(10),5}$-hexahydronaphthalene (II) by reaction of 1-acetoxy-6-oxo-9 - methyl-$\Delta^{5(10)}$-octalin (I) with isopropenyl acetate was described by Boyce and Whitehurst, J. Chem. Soc., 2680 (1961), it has been found that when compound (II) is prepared by this method and the resulting oil carried through subsequent reaction steps a mixture of cis and trans-1-acetoxy-6-hydroxy-9-methyl-decalins is always obtained. Such mixtures have no practical utility as steroid intermediates since separation of the isomers is virtually impossible by known processes.

In adition, Birch, J. Chem. Soc., 4690 (1958) described a method for the preparation of 5-acetoxy-10-methyl-trans-decalone-2 (V) and recognized that said compound was an intermediate useful for the preparation of analogs of steroids. This process involves a reduction with lithium in anhydrous liquid ammonia. While successful, the process is not especially convenient and the yield and quality of the subject compound is inferior. Difficulties inherent in the lithium-liquid ammonia process, namely anhydrous conditions, low solubility of lithium and the organic compound in liquid ammonia, are overcome by the process herein described.

The following examples describe in detail the preparation of representative compounds of the present invention.

*Example 1*

PREPARATION OF 1,6-DIACETOXY-9-METHYL-$\Delta^{4(10),5}$-HEXAHYDRONAPHTHALENE (II)

A mixture of 5 grams of 1-acetoxy-6-oxo-9-methyl-$\Delta^{5(10)}$-octalin (I), 14 ml. acetic anhydride and 14 ml. acetylchloride are heated under reflux in a nitrogen atmosphere for 3 hours. A further 10 ml. acetylchloride is added and heating continued for a further 3 hours. The solvents are distilled under reduced pressure and the residue distilled to give a quantitative yield of 1,6-diacetoxy-9-methyl-$\Delta^{4(10),5}$-hexahydronaphthalene, boiling point 115° C. at 0.025 mm.

When 1-benzoyloxy-6-oxo - 9 - methyl - $\Delta^{5(10)}$ - octalin, which is prepared by reacting 1-hydroxy-6-oxo-9-methyl-$\Delta^{5(10)}$-octalin with benzoylchloride in pyridine, is substituted for 1-acetoxy-6-oxo-9 - methyl-$\Delta^{5(10)}$-octalin, the product from the reaction is 1-benzoyloxy-6-acetoxy-9-methyl-$\Delta^{4(10),5}$-hexahydronaphthalene. When this starting material is employed the products I through VI illustrated on the flowsheet have the 1-acetoxy group replaced by the chemically equivalent 1-benzoyloxy group. Similarly, when a substituted phenyl radical such as tolyl, halo phenyl or the like is substituted for the benzoyl radical in the starting material, the corresponding substituted phenyl compounds I through VI, on the flowsheet are prepared.

Example 2
PREPARATION OF 1-ACETOXY-6-HYDROXY-9-METHYL-$\Delta^{4(10)}$-OCTALIN (III)

A solution of 2.64 grams 1,6-diacetoxy - 9 - methyl-$\Delta^{4(10),5}$ - hexahydronaphthalene (II) in 20 ml. reagent-grade methanol is stirred at 0° C. for 0.5 hour. A solution of 1.6 grams sodium borohydride in 6 ml. water is added dropwise to the stirred methanolic solution during 0.75 hour. After stirring for a further 15 minutes, the mixture is poured into water and extracted with ether. The ether is washed with water, saturated sodium chloride, dried and evaporated. The residue is a viscous colorless oil of 1-acetoxy-6-hydroxy-9-methyl-$\Delta^{4(10)}$-octalin.

Example 3
PREPARATION OF 1-ACETOXY-6-HYDROXY-9-METHYL-TRANS-DECALIN (IV)

Crude 1-acetoxy-6-hydroxy - 9 - methyl - $\Delta^{4(10)}$ - octalin (2.64 grams, 0.01 mole) is dissolved in 50 ml. purified acetic acid and reduced with hydrogen at room temperature and atmospheric pressure in the presence of 250 mg. of 10% palladium-on-charcoal. The theoretical amount of hydrogen is absorbed in 2 hours. The catalyst is removed by filtration and the solvent removed under reduced pressure. Residual acetic acid is removed by azeotropic removal with toluene.

Example 4
PREPARATION OF 1-ACETOXY-6-OXO-9-METHYL-TRANS-DECALIN (V)

The crude 1-acetoxy-6-hydroxy-9-methyl-trans-decalin is dissolved in 35 ml. reagent-grade acetone and cooled to 0° C. This is then titrated with Jones' reagent ($CrO_3$ in sulphuric acid) until a permanent brown color is imparted to the solution. The acetone is poured into water and extracted with ether. The ether is washed with water, sodium bicarbonate solution, dried and evaporated. The residue is dissolved in a small volume of hexane and kept at 0° C. overnight. The solid removed by filtration weighs 1.1 grams and is identical with material produced by known methods and identified by infrared spectrum.

Example 5
PREPARATION OF 1-ACETOXY-6,6-ETHYLENEDIOXY-9-METHYL-TRANS-DECALIN (VI)

A solution of 1.1 grams 1-acetoxy-6-oxo-9-methyl-trans-decalin, 1.0 gram ethylene glycol and 100 mg. p-toluenesulphonic acid in 50 ml. benzene is heated under refluxing conditions under a Dean-Stark water separator for 3 hours. The solution is cooled, the mixture diluted with ether and the organic phase washed with sodium bicarbonate solution, water and saturated brine. After drying the organic phase, the solvents are evaporated to give 1-acetoxy-6,6-ethylenedioxy-9 - methyl-trans-decalin, melting point 116°–117° C.

Example 6
PREPARATION OF 6,6-ETHYLENEDIOXY-1-HYDROXY-9-METHYL-TRANS-DECALIN (VII)

A mixture of 10.72 grams (0.04 mole) of 1-acetoxy-6,6-ethylenedioxy-9 - methyl-trans-decalin, 100 ml. ethanol and 50 ml. 2 N potassium hydroxide solution are heated under reflux for 2 hours. Most of the ethanol is removed by distillation under reduced pressure, the residue diluted with water and extracted with ether. The ether is washed with water, saturated brine, dried and evaporated. The residue crystallizes completely to give 7.9 grams (84% yield) of 6,6-ethylenedioxy-1 - hydroxy - 9 - methyl-trans-decalin, melting point 71°–72° C.

Example 7
PREPARATION OF 6,6-ETHYLENEDIOXY-1-OXO-9-METHYL-TRANS-DECALIN (VIII)

A solution of 1.13 grams (0.005 mole) of 6,6-ethylenedioxy-1-hydroxy-9-methyl-trans-decalin in 10 ml. reagent-grade acetone is cooled to 0° C. with stirring, and then 1.25 ml. of Jones' reagent [J. Org. Chem. 21, 1547 (1956)] added dropwise. After the addition, the solution is stirred for a further 10 minutes and then diluted with 75 ml. water. The aqueous solution is extracted with ether, the ether washed with water and saturated sodium bicarbonate solution, dried and evaporated. The residue is crystallized from hexane at −10° C. to give 0.93 gram (83% yield) of 6,6-ethylenedioxy-1-oxo-9-methyl-trans-decalin, melting point 49°–50° C.

Example 8
PREPARATION OF 6,6-ETHYLENEDIOXY-2-OXIMINO-1-OXO-9-METHYL-TRANS-DECALIN (IX)

To a stirred solution of potassium t-butoxide made by dissolving 0.5 gram potassium in 20 ml. dry t-butanol under dry nitrogen is added 1.55 grams 6,6-ethylenedioxy-1-oxo-9-methyl-trans-decalin (VIII) and the mixture stirred at room temperature for one hour. Butyl nitrite (1.42 grams) is then added dropwise and the mixture stirred for a further two hours after which the mixture is allowed to stand at room temperature overnight in a stoppered flask. The reaction mixture is then diluted with water and extracted with ether. The ether is discarded. The aqueous phase is neutralized with 50 ml. of a 2.5 molar solution of sodium dihydrogen phosphate and extracted with ether. The ether is washed with water, saturated brine, dried and evaporated. The residue crystallizes from ether to give 1.088 grams (62% yield) of 6,6-ethylenedioxy-2-oximino - 1 - oxo-9-methyl-trans-decalin. The purified product has a melting point of 171°–172° C.

Example 9
PREPARATION OF 6,6-ETHYLENEDIOXY-2-DIAZO-9-METHYL-1-OXO-TRANS-DECALIN (X)

To 0.506 gram (2 mmoles) of 6,6-ethylenedioxy-2-oximino-1-oxo-9-methyl-trans-decalin is added 14 ml. water and 2 ml. 1 N sodium hydroxide. The solution is stirred and cooled to 2° C. and 0.27 ml. of concentrated ammonia is added. Then 6.7 ml. of a 5.25% sodium hypochlorite solution is added dropwise. The solution is stirred for a further 2 hours at 2° C. followed by 4 hours at room temperature. The solution is thoroughly extracted with ether, the ether washed with water and saturated sodium bicarbonate solution, dried and evaporated. Bands in the infrared spectrum at 2080 cm.$^{-1}$ and 1620 cm.$^{-1}$ of the product show that the diazo-ketone has been prepared.

Example 10
PREPARATION OF 1-CARBOXY-8$\beta$-METHYL-TRANS-HEXAHYDROINDANONE-5 (XI)

The crude 6,6-ethylenedioxy-2-diazo-1-oxo-9-methyl-trans-decalin from 1 gram 6,6-ethylenedioxy-2-oximino-1-oxo-9-methyl-trans-decalin (IX) is dissolved in 100 ml. purified tetrahydrofuran and 25 ml. water containing 2 grams sodium bicarbonate. The solution is placed in a quartz tube which contains a stirrer and cooling coil and the whole irradiated with ultraviolet light (low pressure mercury lamp). The solution becomes colorless in approximately 30 minutes. Most of the tetrahydrofuran is removed under reduced pressure and the aqueous residue extracted with ether. The organic phase is discarded, the aqueous phase is acidified with concentrated hydrochloric acid and extracted with methylene chloride. The organic phase is washed with water, saturated brine, dried and evaporated. The residue is crystallized from a mixture of acetone and hexane to yield 373 mg. (43% over-all yield) of 1-carboxy-8$\beta$-methyl-trans-hexahydroindane-5, melting point 164°–165° C.

Example 11

PREPARATION OF 1-CARBOMETHYL-5,5-ETHYLENEDIOXY-8β-METHYL-TRANS-HEXAHYDROINDANE (XII)

Crude 6,6-ethylenedioxy-2-diazo-1-oxo-9-methyl-trans-decalin (X) from 1 gram 6,6-ethylenedioxy-2-oximino-1-oxo-9-methyl-trans-decalin is dissolved in 125 ml. absolute methanol and irradiated with a cold water-jacketed mercury lamp. After 20 minutes the solution becomes colorless, the methanol is evaporated and the residue (approximately 90% pure by vapor phase chromatography on a silicone gum rubber column at 200° C.) is identical with the product prepared from 1-carboxy - 8β - methyl-trans-hexahydroindanone-5 by successive methylation with diazo-methane and ketalization with ethylene glycol. Hydrolysis of this photolysis product by base followed by acid hydrolysis gives 1-carboxy - 8β - methyl-trans-hexahydroindanone-5 (XI).

I claim:
1. 1-acyloxy-6-hydroxy-9-methyl-$\Delta^{4(10)}$-octalins, wherein said acyloxy radical is selected from the group consisting of lower alkylcarbonyloxy, phenylcarbonyloxy, methylphenylcarbonyloxy and halophenylcarbonyloxy radicals.
2. 1-acetoxy-6-hydroxy-9-methyl-$\Delta^{4(10)}$-octalin.
3. 1-benzoyloxy-6-hydroxy-9-methyl-$\Delta^{4(10)}$-octalin.
4. 1-acyloxy-6-hydroxy-9-methyl-trans-decalin, wherein said acyloxy radical is selected from the group consisting of lower alkylcarbonyloxy, phenylcarbonyloxy, methylphenylcarbonyloxy and halophenylcarbonyloxy radicals.
5. 1-acetoxy-6-hydroxy-9-methyl-trans-decalin.
6. 1-benzoyloxy-6-hydroxy-9-methyl-trans-decalin.

References Cited

UNITED STATES PATENTS

| 3,058,999 | 10/1962 | Huffman | 260—397.4 |
| 3,067,216 | 12/1962 | Batres et al. | 260—239.55 |
| 3,170,919 | 2/1965 | Fried | 260—239.5 |

OTHER REFERENCES

Chaykovsky: Desertatier Abstract, vol. 22 (1962), pp. 2192–2193.

Cava et al.: Journal American Chemical Society, vol. 84 (1962), pp. 115–116.

Meinwald et al.: Journal American Chem. Soc., vol. 84 (1962), pp. 116–117.

ALEX MAZEL, *Primary Examiner*.

J. H. TURNIPSEED, *Assistant Examiner*.